United States Patent Office 2,760,988
Patented Aug. 28, 1956

2,760,988
BIS(2-HYDROXY-4,5-DICHLOROPHENYL) SULFIDE

Guido Schetty and Walter Stammbach, Basel, Switzerland, assignors to J. R. Geigy A. G., Basel, Switzerland, a Swiss firm No Drawing. Application March 22, 1954,
Serial No. 417,934

Claims priority, application Switzerland May 6, 1953

1 Claim. (Cl. 260—609)

The present invention concerns the production of a strongly active germicidal diphenyl sulphide compound which has a wide range of action.

In the U. S. patent application Ser. No. 327,669, filed December 23, 1952, now Patent No. 2,730,554, diphenyl methane compounds are described of the general formula:

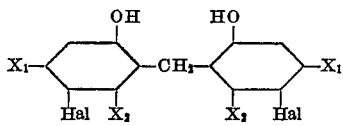

wherein

Hal represents halogen,
One X represents hydrogen or halogen and
The other X represents halogen or the trifluoromethyl group.

It has now been found that a similar compound can be produced by methods known per se by the condensation of 3.4-dichloro-1-hydroxybenzene with sulphur chloride, if necessary in the presence of Friedel-Crafts catalysts. This compound corresponds to the formula:

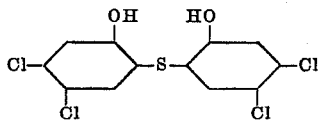

The new polychloro-dihydroxydiphenyl sulphide compound is distinguished by a very good germicidal action. The range of action is superior to that of similar known compounds in that it is active also against certain gram negative bacteria. The minimal marginal concentration which is active against Staphylococcus aureus and Bacterium coli, expressed in $10^{-6}$ mol per litre is 2.9 and 125 respectively.

The condensation with sulphur chloride is performed advantageously in the presence of inert solvents and diluents. As such are suitable for example, carbon tetrachloride or carbon disulphide. If desired, Friedel-Crafts catalysts can be added to accelerate the reaction, e. g. anhydrous aluminum chloride.

The new polychlorodihydroxydiphenyl sulphide is obtained as colourless well formed crystals which are soluble in water in the form of their alkali salts. For disinfection purposes, it is used in aqueous or organic solution or dispersion. It can be worked up for example, in cleansing agents such as soap or synthetic washing agents, in tooth pastes, creams and powders. In suitable ointment bases it has a particularly favourable antiseptic action as a hand cream.

The following examples illustrate the production and use of the polychlorodihydroxydiphenyl sulphide according to this invention. Parts are given as parts by weight and the temperatures are in degrees centigrade.

Example 1

326 parts of 3.4-dichloro-1-hydroxybenzene are dissolved at 30–35° in 1200 parts of carbon tetrachloride. A mixture of 110 parts of sulphur dichloride ($SCl_2$) and 110 parts of carbon tetrachloride are added dropwise within 2 hours at 35–40°. The whole is then stirred for 20 hours at 40–45°. The generation of hydrogen chloride has been completed at the end of this time. 4.4'.5.5' - tetrachloro - 2.2' - dihydroxydiphenyl sulphide which has precipiated completely is drawn off under suction, washed with carbon tetrachloride and dried in the vacuum at 80–90°. After recrystallisation from benzene, a white crystalline powder is obtained which melts at 165–166°.

Analysis.—$C_{12}H_6O_2Cl_4S$, 356 mol.:

| | | | |
|---|---|---|---|
| Calculated | C, 40.4% | Calculated | H, 1.6% |
| Found | C, 40.5% | Found | H, 1.9% |
| Calculated | Cl, 39.8% | Calculated | S, 8.9% |
| Found | Cl, 39.9% | Found | S, 8.8% |

Example 2

4.0 parts of the 4.5.4'.5'-tetrachloro-2.2'-dihydroxydiphenyl sulphide obtainable according to Example 1 are worked up in an ointment base consisting of 51.5 parts of wax-like polyglycol ether of an average molecular weight of 400, 41.0 parts of talcum, 1.5 parts of methyl cellulose mucilage 33% and 2.0 parts of water. An ointment for the hands is obtained which has a good antiseptic action.

What we claim is:

A 2.2'-dihydroxydiphenyl sulphide compound having the formula:

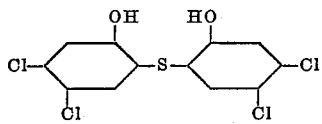

References Cited in the file of this patent
UNITED STATES PATENTS 2,353,735    Kunz _____ July 18, 1944